Figure 1:
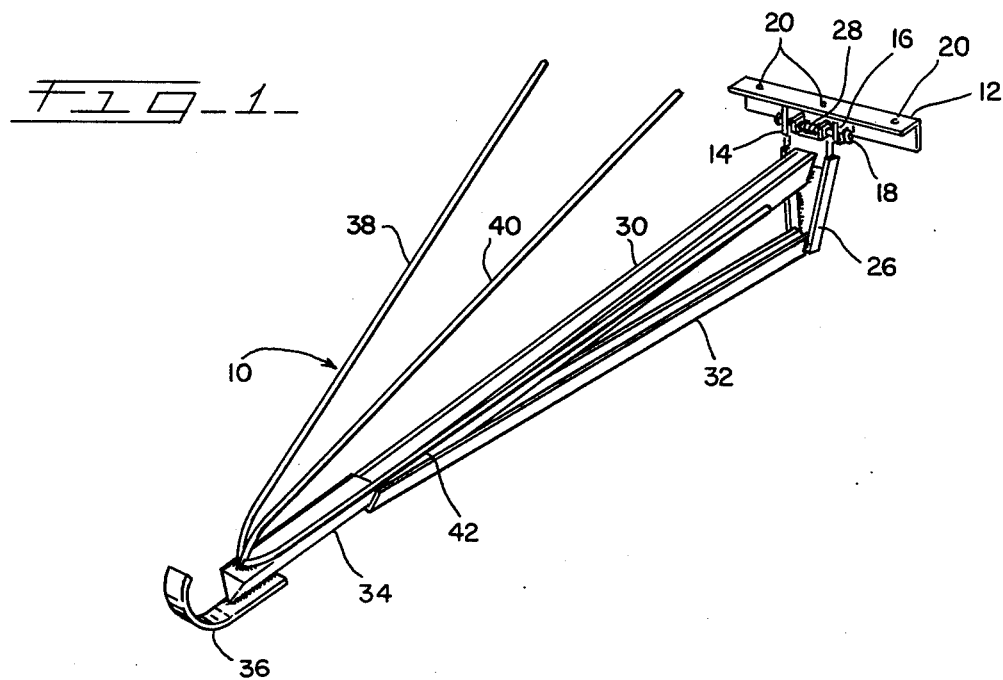

United States Patent [19]
Coxbill

[11] 4,022,000
[45] May 10, 1977

[54] MILO SAVER

[76] Inventor: Duane Coxbill, R.R. No. 1, Edgar, Nebr. 68935

[22] Filed: Dec. 1, 1975

[21] Appl. No.: 636,524

[52] U.S. Cl. .................................................. 56/312
[51] Int. Cl.² ........................................ A01D 63/00
[58] Field of Search ........................... 56/312–314, 56/318–320, 119

[56] References Cited

UNITED STATES PATENTS

| | | | |
|---|---|---|---|
| 658,133 | 9/1900 | Ullmann | 56/312 |
| 2,214,965 | 9/1940 | Love | 56/313 |
| 2,298,414 | 10/1942 | Rice et al. | 56/312 |
| 2,618,114 | 11/1952 | Gaterman, Sr. | 56/314 |

Primary Examiner—J.N. Eskovitz

[57] ABSTRACT

An auxiliary device for use in conjunction with a grain combine and adapted to lift the milo from a flattened position near the ground upwardly so that it may be processed by the combine wherein the auxiliary device includes a front runner assembly adapted to ride along the surface of the ground in front of the combine and a plurality of rod elements extending upwardly and radially outwardly with respect to each other from the front runner to pass the milo upwardly and into the combine, the auxiliary device being pivotally attached to the front of the combine so that it freely moves vertically to adapt to the surface conditions over which it is moving.

1 Claim, 2 Drawing Figures

MILO SAVER

The present invention relates to an auxiliary device for use in conjunction with grain combines for the purpose of lifting flattened milo or sorghum upwardly and into the processing area of the combine.

It is commonly known that much of the yield is lost in the harvesting of milo or soghum in that the milo is readily flattened by snow, strong winds, driving rain, or the like and in this condition is below the level of the pick-up catcher of a grain combine. As such, the flattened milo will not be captured by the combine or processed and all such milo, accordingly, is lost.

Milo is used herein to define a feed for cattle. The alternate term, sorghum, may be used from time-to-time in description of the apparatus. It should be understood that both terms refer to a cereal grass grown for grain, syrup, cattle feed, fodder, and the like.

With the auxiliary device of the present invention I have found that it is possible to obtain a yield in excess of ninety percent of the crop by use of the device in picking up flattened milo and moving it upwardly to the combine where it may be processed.

It is, accordingly, a general object of the present invention to provide an improved auxiliary device for use with a combine which is adapted to lift flattened milo or sorghum from the ground upwardly to the combine where it is processed.

Other objects and advantages of the inventive concept set forth herein reside in the provision of an improved auxiliary device for use with a grain combine which is adapted to lift flattened milo or sorghum from the ground upwardly to the combine for processing, which is easy to manufacture, which is adapted for use in conjunction with any combine; which is easy to use; which is durable in use and which is economical to manufacture and use.

The features which are believed to constitute the inventive concept set forth herein are set forth with particularity in the appended claims.

Figure 2:
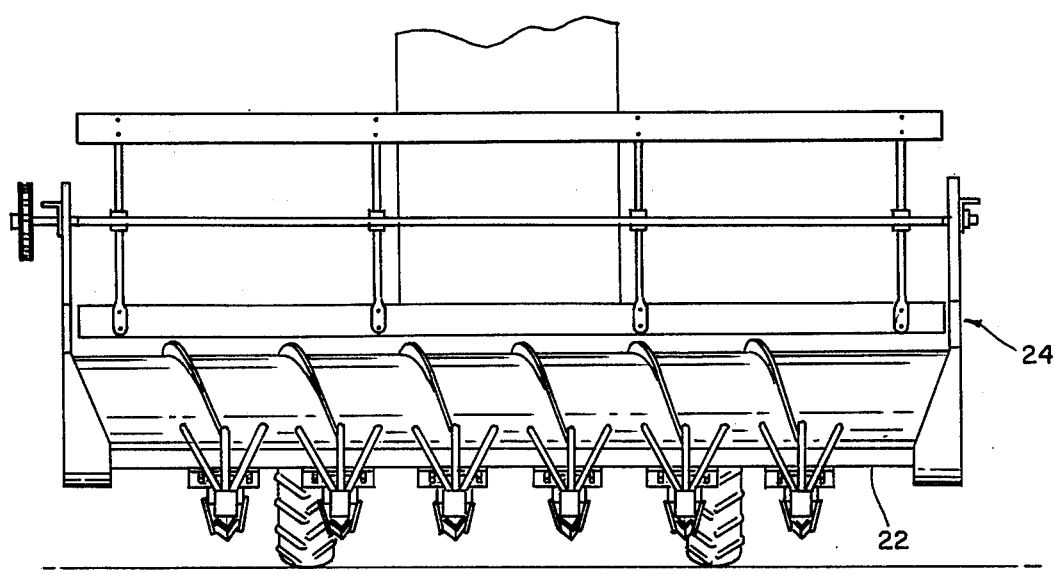

Other objects and advantages of the inventive concept, however, may be understood by reading the detailed description of the inventive concept in conjunction with the drawings, in which:

FIG. 1 is a perspective view of the auxiliary attachment disclosed herein in detail; and FIG. 2 is a schematic illustration showing the auxiliary attachment secured to the front of a combine.

Referring more particularly now to the drawings the auxiliary attachment for use with a combine is illustrated generally at 10 in FIG. 1. The auxiliary device is defined by a support bracket 12 having a pair of depending arms 14 and 16 integrally affixed thereto. The lower terminals, respectively, of the arms 14 and 16 are provided with an opening (not shown) extending therethrough into which a pivot assembly bolt 18 is placed. The bolt 18 extends through the openings and beyond the outer surfaces of the depending arms 14 and 16, respectively, as schematically illustrated in FIG. 1 of the drawings.

The support bracket 12 is further provided with a plurality of openings 20 extending through the top surface thereof and defining means for releasably securing the assembly to the front of a combine as schematically illustrated in FIG. 2 of the drawings. That is, bolts extend through the opening 20 and through the chute 22 of the combine 24 to rigidly, releasably attach the support bracket 12 with respect to the front lip of the chute 22 of the combine 24.

The bolt 18 is secured to the depending arms 14 and 16 by appropriate lock washers and nuts as schematically illustrated in FIG. 1.

A support bracket 26 is pivotally suspended from the support bracket 12 by the pivot assembly bolt 18. The support bracket 26 is defined by a generally V-shaped configuration as schematically illustrated in FIG. 1 of the drawings and includes an upper portion 28 having an opening (not shown) extending therethrough. The upper portion 28 of the support bracket 26 is adapted to be pivotally supported by the bolt 18. It can readily be seen that the bolt 18, before assembly to the arms 14 and 16, will be received within the opening defined in the upper portion 28 of the bracket 26 to thereby pivotally support the bracket 26 with respect to the pivot assembly bolt 18.

A pair of support channels 30 and 32 are rigidly secured at one end to the support bracket 26 in spacedapart position on said bracket as schematically illustrated in FIG. 1. The support channels 30 and 32 are mounted such that they taper toward each other in a generally V-shaped configuration and join at the outer terminals thereof where they are rigidly secured to one end of the block 34. The opposite end of the block 34 is, in turn, rigidly secured to the back of the runner element 36, as shown.

The runner element itself is defined by a piece of bar stock of generally rectangular cross-section having a flat portion extending into a hook at the front thereof and terminating in a free end to define a generally J-shape in side elevation.

A plurality of lifting bars 38, 40 and 42 are welded at one end, respectively, to the block 34 as shown. The bars 38, 40 and 42 extend generally upwardly and radially outwardly with respect to each other to terminate in a free end spaced from the block 34 and above the upper support channel 30, as illustrated. The free ends or terminals of the bars 38, 40 and 42 are adapted to be positioned over the front lip of the chute 22 when the assembly 10 is in assembled relationship with respect to the combine 24.

It can readily be seen that when the combine 24 is in use with the auxiliary attachment 10 disclosed herein the combine will be lowered with respect to its operating device so that the front lip of the chute 22 will be relatively close to the ground and the runner elements 36 of each assembly 10 will be in physical contact with the ground and riding over the surface of the ground. In this position any milo or sorghum which may be flattened or bent in some manner will be lifted when the runner 36 passes thereunder and will pass along the lift bars 38, 40 and 42 to be elevated and brought into the chute 22 of the combine 24 as the combine is moved along over the surface. In this manner milo which otherwise would have been passed over by the combine will be caught and will be processed in accordance with the general crop of sorghum. Accordingly, I provide herein a means for obtaining substantially ninety percent, or greater, yield in the harvest of milo or sorghum by processing substantially all of said materials which otherwise would have been passed over by the combine.

While I have shown and described a specific embodiment of the inventive concept in accordance with disclosing my development, it should be understood that other modifications and alternative constructions may be provided without departing from the substance of the inventive concept. It is, accordingly, my intention by the appended claims to cover all such alternative constructions and modifications as may fall within the true spirit and scope of the claims.

I claim:

1. An auxiliary device for use in conjunction with a combine to lift flattened cereal stalks upwardly toward the combine for processing, the auxiliary device comprising, in combination:

a first support bracket having means thereon to secure said first support bracket to the combine when the auxiliary device is to be used in combination with the combine, a second support bracket pivotally supported with respect to said first support bracket, a support channel being rigidly secured at one end to the second support bracket and extending outwardly therefrom and terminating in an outward end, a block rigidly secured at one end to the outward end of the channel and extending outwardly thereof, a front runner element rigidly secured to the opposite end of said block, and a plurality of lift bars rigidly secured at one end to said block and extending upwardly and radially outwardly from said point of attachment toward the first support bracket of the auxiliary device whereby when said auxiliary device is secured to the combine for use in combination therewith the assembly from the second support bracket to the runner element will be pivotally supported for vertical movement with respect to the first support bracket so that as the runner moves along the ground the said portion will be free to move vertically in accordance with irregularities in the surface and whereby the flattened cereal grain stalks will be picked up by the lift bars and moved upwardly to a point where they will be brought into the processing area of the combine; and said second support bracket pivotally supported from depending arms rigidly defined on said first support bracket, and a second support channel extending from the second support bracket to the block, said second support channel located above said support channel while converging toward its outward end.

* * * * *